United States Patent [19]
Reichel et al.

[11] 4,321,528
[45] Mar. 23, 1982

[54] APPARATUS FOR THE DISPLAY OF FREQUENCY DISTRIBUTIONS OF MEASURED VALVES, OR THE LIKE, OVER AN ADJUSTABLE MEASURING RANGE

[75] Inventors: Hilmar Reichel, Planegg; Karl-Heinz Hoogen, Munich, both of Fed. Rep. of Germany

[73] Assignee: Siemens Aktiengesellschaft, Berlin & Munich, Fed. Rep. of Germany

[21] Appl. No.: 124,137

[22] Filed: Feb. 25, 1980

[30] Foreign Application Priority Data

Apr. 20, 1979 [DE] Fed. Rep. of Germany ....... 2916158

[51] Int. Cl.³ ............................................ G01R 23/16
[52] U.S. Cl. ................................. 324/77 D; 324/77 B
[58] Field of Search ........... 364/485; 324/77 R, 77 B, 324/77 D, 77 E, 77 G, 78 D

[56] References Cited

U.S. PATENT DOCUMENTS

4,084,245  4/1978  Bunge ............................... 324/77 B

*Primary Examiner*—Michael J. Tokar
*Attorney, Agent, or Firm*—Hill, Van Santen, Steadman, Chiara & Simpson

[57] ABSTRACT

Apparatus for displaying frequency distributions of measured quantity or the like, preferably as a histogram, over an adjustable measuring range which is divided into continuously numbered classes of equal size, provides means for storing the measured quantities, switches for preselecting the number of quantities to be displayed, and updating circuits for removing the oldest measured quantity in a sequence and replacing the same by the newest measured quantity.

18 Claims, 5 Drawing Figures

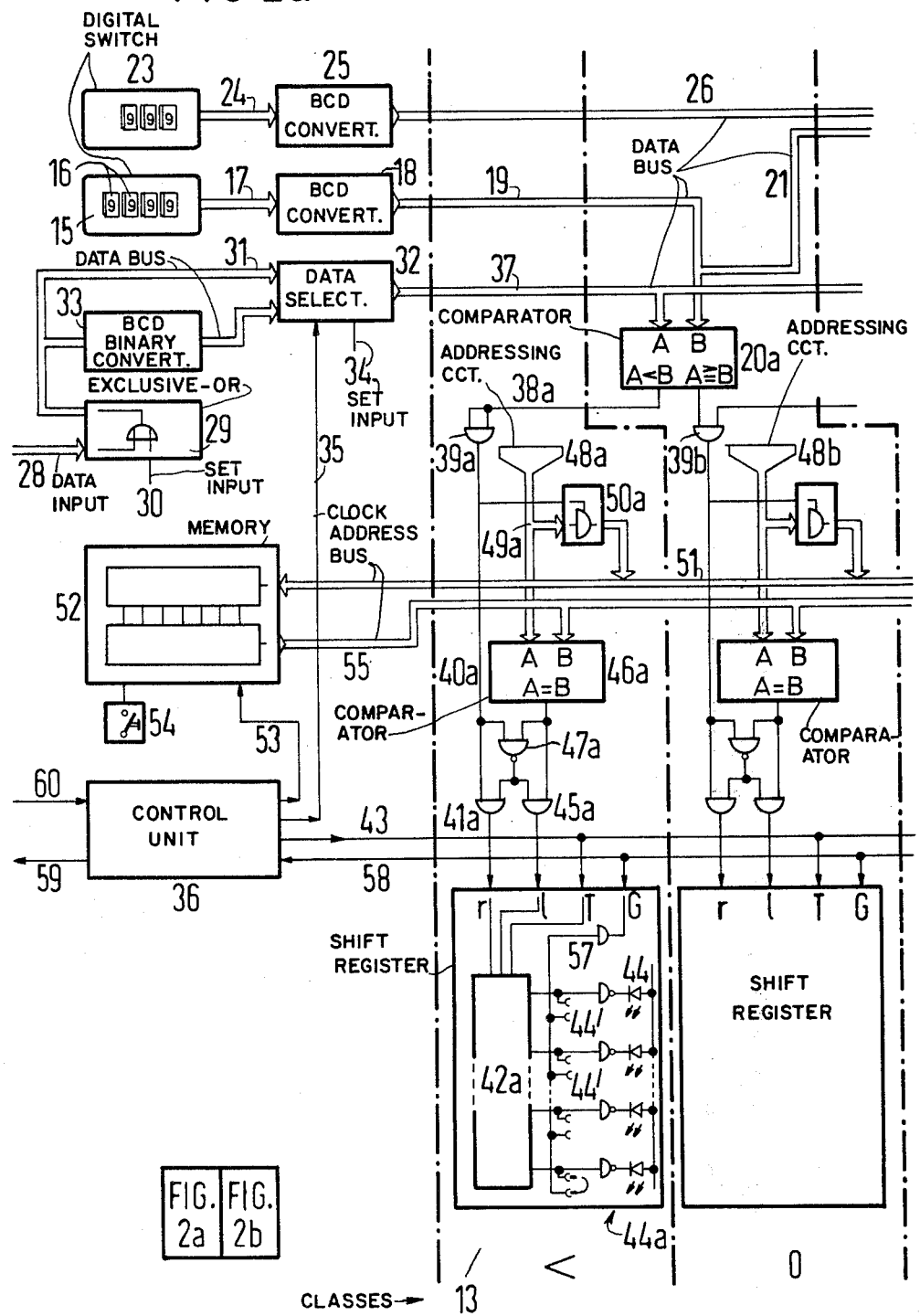

APPARATUS FOR THE DISPLAY OF FREQUENCY DISTRIBUTIONS OF MEASURED VALVES, OR THE LIKE, OVER AN ADJUSTABLE MEASURING RANGE

BACKGROUND OF THE INVENTION

1. Field of the Invention

The present invention relates to an apparatus for displaying frequency distributions of measured values, or the like, over an adjustable measuring range wherein the measuring range is subdivided into sections of equal size and the sections are continuously numbered, whereby the number of measured values falling into each size class is stored and displayed and is capable of being read out.

2. Description of the Prior Art

An apparatus of the type generally set forth above has become known from the periodical "Electrical Engineering," 1978, Vol. 1, pp. 61–65. This apparatus serves the purpose of continuous monitoring of the pulse of human beings over long periods of time in order to be able to determine (or ascertain) cardiac rhythm malfunctions (or disturbances). It processes the signals derived from the pulse, according to the principle of frequency distribution, into a histogram (or stepped polygon). Since the absolute values of the chronological intervals of successive pulses are not of such great interest for the formation of the histogram, only the fluctuations of these values about a mean value are detected.

The classification proceeds according to the counting principle; i.e., a conversion of the quantity "time" into a digital quantity is carried out by means of counting out pulses of an oscillator. In the case of every measuring clock pulse, this quantity, stored in a counter, is transferred into a classification unit whose output information represents the respective class assignment, or address, respectively. The address ascertained by the classification unit is summed up in a class-wise fashion in a memory with the aid of a measuring clock pulse. The addition operation require several command steps which are executed in the memory by means of a sequence of pulses of a special sequence control. Furthermore, the known apparatus exhibits an addressing unit which activates the memory and an output matrix by way of addresses. The memory information can be rendered visible on a light-emitting diode display in the form of a histogram. Additions are possible from the memory until a maximum occupation (assignment) in a class occurs. Thereafter, additional classifications are blocked. As soon as such a blocking is present, the various programs can be activated. Therefore, a subtraction program can be triggered, whereby, in each of the classes, a reduction by one is effected, as long as at least one value was stored. In case the number of stored values was zero in advance, the subtraction operation does not take the place in the corresponding class. The corresponding histograms are thereby displaced "downwardly" by one location in the course of several subtractions.

In addition, with blockage of the memory as a consequence of an attained maximum occupation of a class, an automatic recorder output can be activated, whereby the histogram is read out on a synchronously-started recorder. Subsequently, the histogram is erased. In this manner, short-period histograms can be read in certain time intervals which permit inferences regarding the dynamics of the cardiac activity over longer periods of time.

An apparatus of this type can be introduced only to a limited degree in the technical field because a precise chronological, statistical distribution is not readily recognizable.

SUMMARY OF THE INVENTION

The object of the present invention is to provide, according to the present invention, in an apparatus of the type generally set forth above, a further development such that the apparatus can be universally employed. In particular, the apparatus should be capable of being employed in the technical field; namely, generally for the purpose of monitoring fabrication processes.

The above object is achieved, according to the present invention, by virtue of the fact that the number of measured quantities, which are to be altogether indicated, is preselectable. In the case of exceeding the preselected number, the oldest measured quantity in the sequence can be canceled by every new measured quantity. By virtue of the fact that the number of the measured quantities to be displayed is restricted in advance, a good recognition of the statistical distribution results. Due to the fact that, during classification of a new measured quantity, the respectively oldest measured quantity is removed from the histogram, a change in the statistical distribution can be immediately recognized. This is particularly important in the case of monitoring of fabrication processes.

The number of measured quantities to be displayed is advantageously predetermined with the aid of an adjustable memory in which the addresses of the classes or the measured quantities are stored in the sequence of their activation, or their arrival, respectively. Preferably, in the case of a full memory, the address of the class, activated by the next-following measured quantity is transferred into the memory, and simultaneously the class address associated with the oldest measured value is read, which corrects the contents of the memory associated with this class.

BRIEF DESCRIPTION OF THE DRAWINGS

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
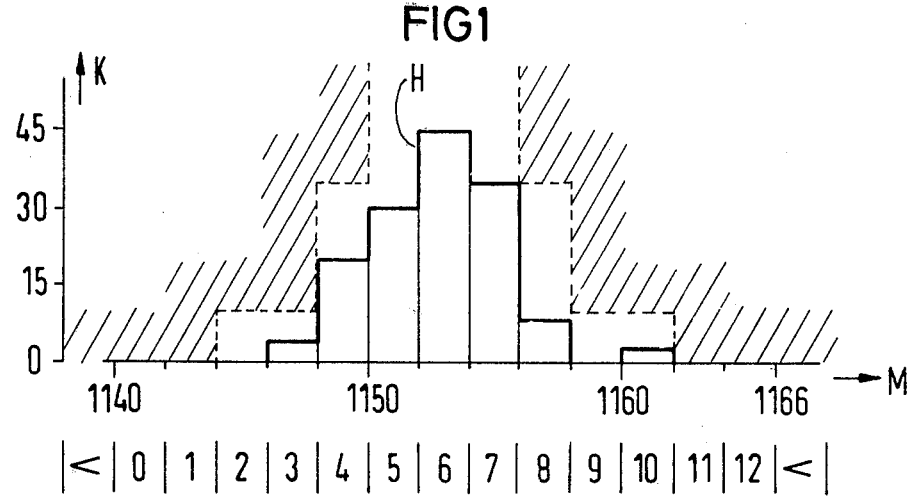
FIG. 1 is a graphic illustration, in particular a histogram, capable of representation by the display device constructed in accordance with the present invention.

Referring to FIG. 1, a histogram H, known per se, is illustrated, whereby, in dependence upon a random measured quantity M, the absolute class frequency K is supplied as a number. Such a histogram H is to be capable of representation with apparatus constructed in accordance with the present invention. In the case of a selected exemplary embodiment, only the range of 1140-1166 is of interest. This range is subdivided into classes 0-12 of equal size. Bordering on this range above and below are two ranges for values which do not fall into the preselected class intervals 0-12 . These ranges are characterized by the reference < for greater and smaller. The number of events falling into these ranges is likewise displayed, in order to, among other things, facilitate the adjustment of the most suitable measuring range.

As is apparent from the numbering according to FIG. 1, in the exemplary embodiment, the class width is 2. Through corresponding preselection of the class initiation, the histogram can be so placed that the maximum of the frequency falls into the center classes 5-7. For this reason, it is important for the class beginning and the class width to be preselectable. The measured quantity plotted along the X axis must be a digital quantity; i.e., every analog measured quantity must first be converted into a digital quantity, which per se present no problem. In FIG. 1, a nominal range of frequency distribution is plotted with broken lines. For the individual classes 0-12, the latter nominal range represents a limiting value which is, for example, predeterminable with limiting value reporting units, as shall be explained in greater detail hereinbelow. In the histogram H, illustrated in FIG. 1, these limiting values are not exceeded.

It is major significance that, for the formulation of the histogram, only a very specific number of measured values, or events, respectively, is employed in order to be able to evaluate the statistical distribution in such a manner that corresponding conclusions can be drawn. For this reason, the apparatus constructed in accordance with the present invention is so designed that it always indicates the current reading. This is achieved by virtue of the fact that, when the number of measured quantities to be taken into consideration is exceeded, the respective "oldest" measured quantity is removed from the histogram upon arrival of a "new" measured quantity. Therefore, after every measured quantity, the graphic representation illustrates the current reading.

Figure 2B:
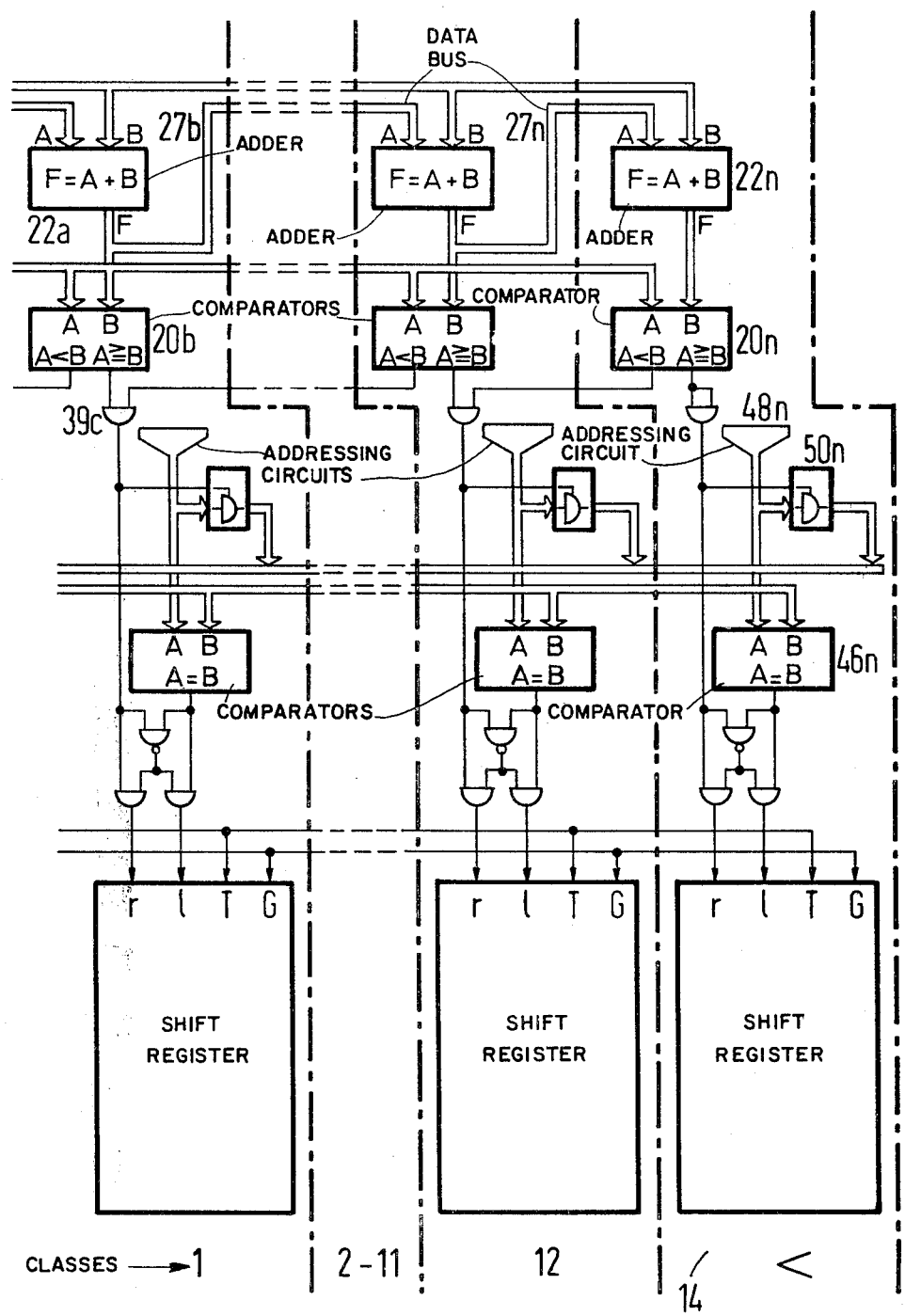
FIG. 2, including FIGS. 2a and 2b, taken together, is a block circuit diagram of a display device constructed in accordance with the present invention.

FIGS. 2a and 2b illustrate, in a block circuit diagram, a display device for frequency distributions. As illustrated in FIG. 1, 13 class interval 0-12 are provided, as well as two classes, associated with the ranges above and below (the ranges 13 and 14) for display of the values which do not fall into the classes 0-12. The number of classes 0-12, as well as the two classes 13 and 14 are fixed in terms of circuitry. Preferably, the circuit of every class 0-14 is arranged on a plug-in card, so that the class number can be expanded by one class through addition of an additional plug-in card, or if a card, for example the card of the class 12 is removed, the class number is reduced by one. In this case, the class 14 is then directly adjacent the class 11. The circuits of classes 1-12 are virtually identical and the circuit of class 14 differs only slightly from the latter. The classes 0 and 13 differ from the remaining classes 1-12 merely by the type of classification. Through a digital switch 15 the class beginning virtually for all classes 0-14 is predetermined. As is apparent, with the aid of handles, such as thumb wheels 16, a four-digit number can be set, in particular from 1-9999. The number set with the aid of the digital switch 15 is available at an output 17 in a binary coded decimal (BCD) code. Since the further processing proceeds in the binary code, a BCD binary converter 18 is provided, at the output of which a data bus 19 is connected which is connected with one input B of a comparator 20a, on the one hand, and with an input A of an adding stage 22a by way of a data bus 21, on the other hand.

By way of an additional digital switch 23, the class width can be adjusted, in particular from 0-999. By way of an output 24, the digit, output in the BCD code, is supplied to a BCD binary converter 25, to the output of which a data bus 26 is connected which is also connected with inputs B of the adding stages 22a-22n. The sum A+B is then present at the output F of the adder 22a-22n. By way of one data bus 27b-27n, respectively, the class beginnings of the preceding stages are specified to the following adder stages 22b-22n.

By way of a data input 28, the measured quantities to be recorded are supplied to the device. These measured quantities can be input in a BCD code or a binary code; in particular, they may be provided in positive as well as negative logic. For this reason, an EXCLUSIVE OR circuit 29 is provided with includes a set input 30. If a "0" signal is connected to the input 30, the positive logic becomes effective, and if a "1" signal is connected to the input 30, the negative logic become effective.

One output of the EXCLUSIVE OR circuit 29 is directly connected, by way of a data bus 31, to a data selector 32 and indirectly connected by way of a BCD binary converter 33 to the data selector 32 in order that the data can be input in either a BCD code or a binary code. By way of a set input 34, the data selector 32 is activated; in particular, with a "1" signal the BCD code is effective, and with a "0" signal, the binary code is effective. Therefore, the measured quantity present at the output 28 is stored in a binary code in the data selector 32. By way of a clock pulse line 35, which is in connection with a control unit 36, the measured quantity stored in the data selector is placed on a data bus 37 which is connected to the inputs A of the comparators 20a-20n. Each of the comparators has two outputs $A < B$ and $A \geq B$. The output $A < B$ of the comparator 20a then receives a signal when the measured quantity present by way of the input 28 is smaller than the class beginning set with the aid of the digital switch 15. Since this value is likewise to be brought to display; namely in the class 13, the output $A < B$ of the comparator 20a is connected, via a line 38a and an AND gate 39a, as well as a line 40a and an AND gate 41a, to an input r of a shift register 42a. Through a clock pulse on a line 43 which is applied to a clock pulse input T of the shift register 42a, this signal is stored in the shift register and, for example, displayed with the aid of a diode 44 of a series of light-emitting diodes 44a. The shift register 42 includes an additional input l with which the shift direction can be reversed in case the output of an additional AND gate 45a carries a signal. The AND gate 45a is connected, at one of its inputs, to the output of an additional comparator 46a which emits a signal only in a special case, which shall be explained in greater detail below. By way of a NAND gate 47a, the outputs of the AND gate 39a and of the comparator 46a are connected with the two inputs of the AND gates 41a and 45a. Since the inputs of the NAND gate 47a carry a "1" signal or a "0" signal, respectively, its output also carries a "1" signal. Since the line 40a likewise carries a "1" signal, the AND gate 41a is transmissive, whereas the AND gate 45a is blocked.

Figure 4:
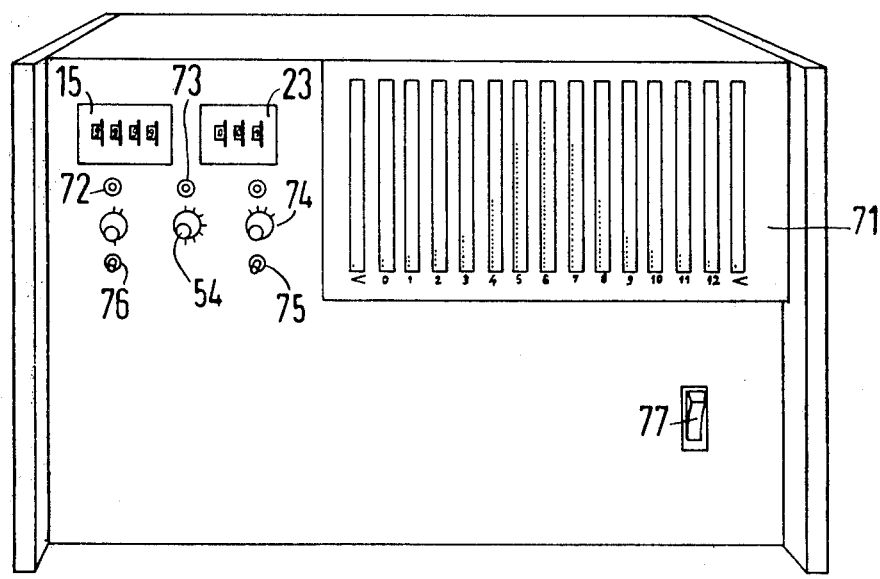
FIG. 4 is an elevational view of a device constructed in accordance with the present invention.

There is associated with every class an addressing circuit 48a-48n which is in connection with one input A of the comparator 46a by way of a data bus 49a, on the one hand, and which is connected with a memory 52, which, in the present case, is a shift register, by way of a gate 50a and an address bus 51. Therefore, as soon as the line 40a receives a "1" signal, the gate 50a is released (or enabled) and hence the address of the address circuit 48a is input into the shift register 52. The shift register 52 is driven by clock pulses by way of a line 53 from a control 36. The shift register 52 can preferably be adjusted in step-by-step fashion to specific values, in particular with the aid of a switch 54, schematically illustrated on the drawing, which is preferably designed as a rotary switch. With the aid of the switch 54, the number of displayed measured quantities can be preselected. As illustrated in FIG. 4, the measuring range of 25-150 is adjustable in steps of 25. In one position ∞ all arriving measured quantities are recorded and displayed. Therefore, with receipt of a measured quantity by means of a clock pulse of the control 36, the shift register 52 is advanced by one step.

The output of the shift register 52 is connected to an address bus 55 which, in turn, is connected to the inputs B of the comparators 46a-46n. Subsequent to passage of the initially stored address through the shift register 52, this value appears on the address bus 55 upon arrival of a new measured quantity. If coincidentally class 13 is again activated by the new value; i.e. if the measured quantity lies below the class beginning, then the inputs A and B of the comparator 46a receive the same signal; i.e. A is equal to B, so that the output of the comparator 46a carries a "1" signal, which has as a consequence that both inputs of the NAND gate 47a receive a "1" signal; since, in this case, the output of the NAND gate carries a "0" signal, the two AND gates 41a and 45a are blocked, so that there is no change in the state of this shift register 42a.

If, however, the measured quantity, input at the input 28a, is greater than the beginning of the class, in this case, the line 40a conducts a "0" signal, whereas the output of the comparator 46a conducts a "1" signal. Accordingly, only the AND gate 45a is activated, and hence a signal is transmitted to the input 1 of the shift register 42a, as a consequence of which the memory contents of the shift register 42a is reduced by one value. However, the display is also corrected in a corresponding fashion.

Therefore, the outputs F of the adder stages 22a-22n determine the beginning of every class 0-12. The comparators 20a-20n compare these values with the respective measured quantity on the data bus 37. If, for example, the quantity specified by the adding unit 22a is greater than that specified on the bus 37, the output A<B carries a "1" signal, and activates the AND gate 39b of the next lower class. If, by way of contrast, the quantity specified by the data bus 37 is greater than or equal to the quantity specified by the adder stage 22a, then the output A≧B receives a "1" signal and activates the AND gate 39c, which, however, only becomes effective when a signal is provided from the next-higher class to indicate that the measured quantity does not fall in the next-higher class.

As the display of class 13 shows, two terminals 44' for the purpose of nominal value specification are associated with each diode 44 of the light-emitting diode series 44a. The one terminal is directly connected to the line associated with the diode 44, whereas the other terminal is connected, by way of a gate 57, with an output G of the shift register 42a. The output G is connected to the control 36 by way of a line 58. The line 58 receives a signal as soon as the preselected value has been reached. By way of a line 59, a signal can be tapped which makes a statement that a preselected limiting value has been exceeded. A clock pulse input 60 is provided for the control circuit 36.

Figure 3:
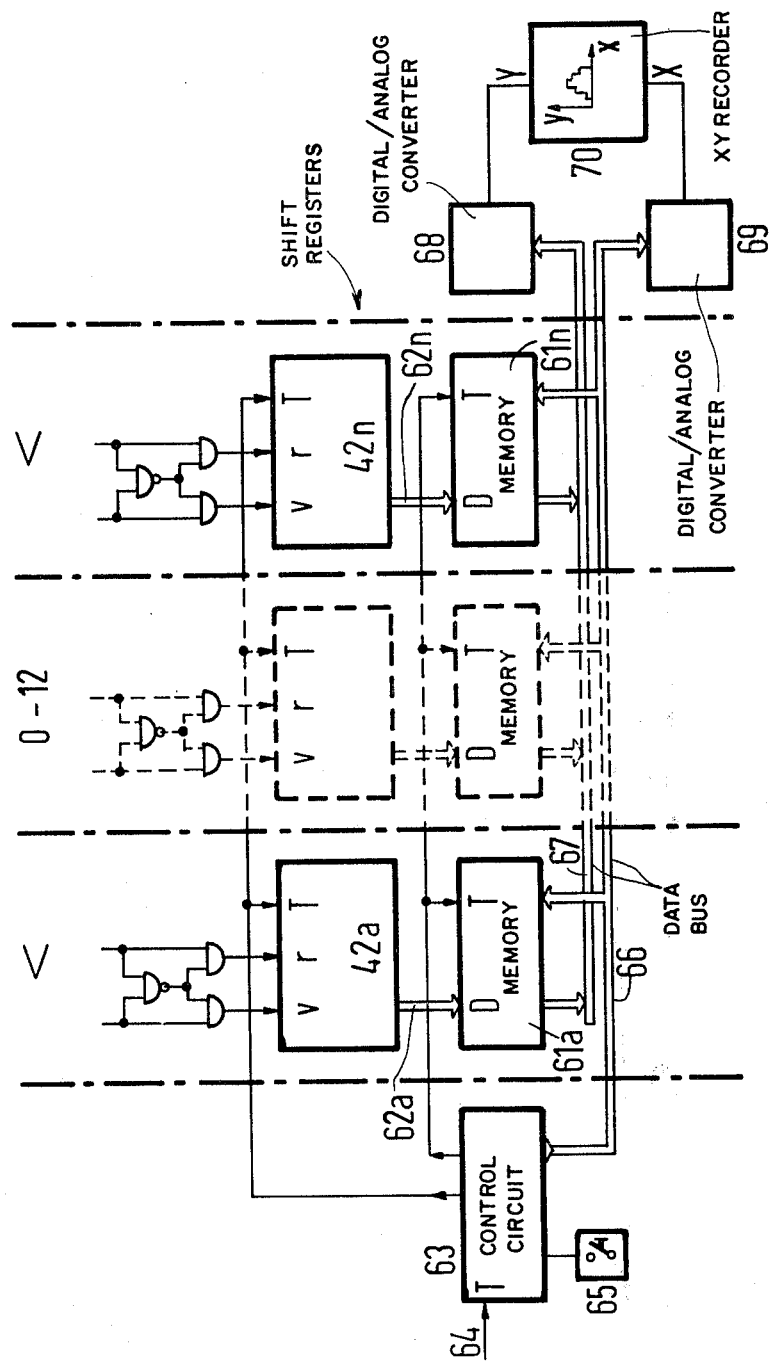
FIG. 3 is a block circuit diagram of a recorder connection for practicing the present invention.

FIG. 3 illustrates a block circuit diagram of a recorder connection, whereby parts illustrated in FIG. 2 have been provided with the same reference characters. At each shift register 42a-42n, according to FIG. 2, a memory 61a-61n is connected, whereby, by way of a data bus 62a-62n the data are transmitted when a call signal is provided by way of a clock pulse input T, which comes from a control circuit 63. The control circuit 63 has a clock pulse input 64. By way of an input of the control circuit 63, a data output can be started with the aid of a key switch 65. By way of an address bus 66, the individual memories 61a-61n are activated, and by way of a data bus 67, the stored data are output. Digital/analog converters 68 and 69 are provided by way of which the addresses and the data are delivered to an X/Y recorder 70 which records the stored histogram. This recording corresponds to the current state after every measured quantity.

FIG. 4 illustrates the display device, whereby, in a display field 71, the individual diode series 44a-44n are arranged. A signal lamp 72 illuminates when the clock pulse is present. An additional signal lamp 73 indicates the overflow of the data input 28, and a lamp 74 indicates when a limiting value of one of the classes is exceeded. With a key 75, all memories can be erased. In addition to the individual diodes 44 of the diode series 44a-44n, the corresponding terminals 44' for the adjustment of the limiting value are represented. An on-off switch 76 is provided for the purpose of interrupting the clock pulse, and a mains switch 77 is provided as an on-off switch for the unit.

Instead of the shift register 52, an equivalent means may be provided, for example a processor-control memory may be employed. In the exemplary embodiment, the addresses of the classes 0-14 are stored in the memory 52. However, the measured quantities could also be directly stored, which, however, would considerably increase the expense for the shift register.

Although we have described our invention by reference to particular illustrative embodiments, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. Apparatus for displaying frequency distributions of sequentially-arriving measured quantities over a measuring range which is divided into sections of equal class, the sections being continuously numbered, comprising:

storage means for storing a number of measured quantities which fall into a class;
   display means for displaying the stored quantities in each class;
   preselection means for selecting the number of total quantities to be displayed; and
   up-dating means responsive to receipt of the selected number of quantities to erase the oldest stored quantity and store the newest received quantity.

2. The apparatus of claim 1, and further comprising:

storage control means for receiving the measured quantities and storing the same in said storage means in the sequence received.

3. The apparatus of claim 1, wherein said preselection means comprises:
a memory storing addresses of the classes.

4. The apparatus of claim 3, wherein said up-dating means comprises:
means responsive to a full memory and the next-received measured quantity to store the class address of such quantity in said memory and erase the address associated with the oldest measured quantity to correct the contents of said storage means.

5. The apparatus of claim 4, wherein said memory comprises:
a clock-controlled shift register.

6. The apparatus of claim 5, wherein said storage means and said display means comprise:
forward-backward shift registers for the respective classes; and
light-emitting diodes connected to said shift registers for displaying the shift register conditions in the form of a histogram.

7. The apparatus of claim 6, comprising:
threshold valve means connected to said light-emitting diodes for providing a predetermined nominal value of a statistical distribution.

8. The apparatus of claim 7, wherein said light-emitting diodes are connected to plug-in terminals and said threshold valve means is in the form of a plug-in card.

9. Apparatus for displaying frequency distributions of measured quantities arriving sequentially as digital signals and extend over a measuring range which is divided into a plurality of continuously numbered size classes comprising:
a plurality of display units each assigned to a respective class;
a plurality of storage units, each connected to a respective display unit for storing a selected number of the measured quantities;
a plurality of address units, each assigned to a respective class and storing a class address;
an address memory connectible to said plurality of address units for selectively storing addresses;
input means for receiving the digital measured quantities including class beginning selection means and class width selection means, and operable to provide a respective class output signal in response to receipt of a respective measured quantity of a class within the selected class width;
a plurality of up-dating circuits, each for a respective class and each connected to the respective storage unit and to said address memory, each of said up-dating circuits including first means responsive to a class output signal to store the same in the respective storage unit, second means operable in response to a class output signal to connect the respective class address unit to said address memory to store the class address, and third means connected to the respective address unit and to said address memory for comparing the addresses and, in response to equality, inhibits storage in the respective storage unit.

10. The apparatus of claim 9, wherein each of said display units comprises:
a plurality of light-emitting diodes connected to the respective storage unit.

11. The apparatus of claim 10, wherein each of said storage units comprises:
a shift register including a plurality of outputs connected to respective light-emitting diodes.

12. The apparatus of claim 11, comprising:
a plurality of output memories, each connected to a respective shift register;
recording means connected to said plurality of output memories; and
control means connected to said recording means and to said plurality of output memories for reading the output memory contents into said recording means.

13. The apparatus of claim 12, wherein said recording means comprises an X/Y plotter and said control means comprises digital/analog converter means connecting said X/Y plotter and said output memories.

14. The apparatus of claim 9, wherein said address memory comprises:
a clock-controlled shift register.

15. The apparatus of claim 14, comprising:
switch means connected to said shift register for setting the same to define the number of measured quantities to be displayed.

16. The apparatus of claim 9, wherein said class beginning selection means comprises:
switch means operable to select and provide digital signals representing class beginnings; and
a plurality of comparators, each for a respective class above the lowest class, connected to said switch means and to receive the input signals and operable to produce the class output signal for the next respective lower class.

17. The apparatus of claim 16, comprising:
other switch means operable to selectively produce digital signals defining class width; and
a plurality of adders, each for a respective class above the two lowest classes adding the outputs of and connecting said switch means and said other switch means to the respective comparator for determining whether an input signal is within a defined class and class width to produce a class output signal.

18. The apparatus of claim 9, comprising:
a plurality of gate circuits, each assigned to a respective class, and each operated by a respective class output signal to connect the respective address unit to said address memory.

* * * * *